United States Patent
Galtier et al.

(10) Patent No.: US 6,748,315 B2
(45) Date of Patent: Jun. 8, 2004

(54) PROCESS FOR DETECTING CYCLICAL FLUCTUATIONS IN COMBUSTION IN AN INTERNAL COMBUSTION ENGINE

(75) Inventors: Frédéric Galtier, Regensburg (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 34 days.

(21) Appl. No.: 10/300,534

(22) Filed: Nov. 20, 2002

(65) Prior Publication Data

US 2003/0094037 A1 May 22, 2003

(30) Foreign Application Priority Data

Nov. 21, 2001 (DE) .......................................... 101 57 059

(51) Int. Cl.[7] .............................................. F02D 41/22
(52) U.S. Cl. ........................ 701/111; 701/114; 701/115; 73/117.3; 123/198 F
(58) Field of Search ................................ 701/111, 110, 701/114, 102, 115; 73/116, 117.3; 123/198 D, 198 F

(56) References Cited

U.S. PATENT DOCUMENTS

| 5,377,536 A | 1/1995 | Angermaier |
| 5,433,107 A | 7/1995 | Angermaier et al. ............ 73/16 |
| 5,499,536 A | 3/1996 | Wier et al. .................. 73/117.3 |
| 5,808,186 A * | 9/1998 | Matsumoto et al. ........ 73/117.3 |
| 5,822,710 A * | 10/1998 | Mezger et al. ............... 701/110 |
| 6,062,071 A | 5/2000 | Henn et al. ................. 73/117.3 |
| 6,082,188 A | 7/2000 | Angermaier ................ 73/117.3 |
| 6,679,108 B2 * | 1/2004 | Robertson et al. ......... 73/117.3 |

FOREIGN PATENT DOCUMENTS

| DE | 199 63 457 A1 | 7/2001 | ........... F02D/12/06 |
| EP | 0 576 705 B1 | 6/1992 | |
| EP | 0 583 496 B1 | 8/1992 | |
| EP | 0 632 260 B1 | 6/1993 | |
| WO | WO 97/20195 | 6/1997 | |
| WO | WO 97/22786 | 6/1997 | |

* cited by examiner

*Primary Examiner*—Hieu T. Vo
(74) *Attorney, Agent, or Firm*—Mayer, Brown, Rowe & Maw LLP; David M. Thimmig

(57) ABSTRACT

A method of detecting misfires in an internal combustion engine based on the crankshaft speed, in the case of which cylinder segment times are measured and differences between consecutive segment times are analyzed by means of a prescribed algorithm and where one cylinder group is switched off and the analysis is carried out for the cylinder group continuing to be operated.

12 Claims, 2 Drawing Sheets

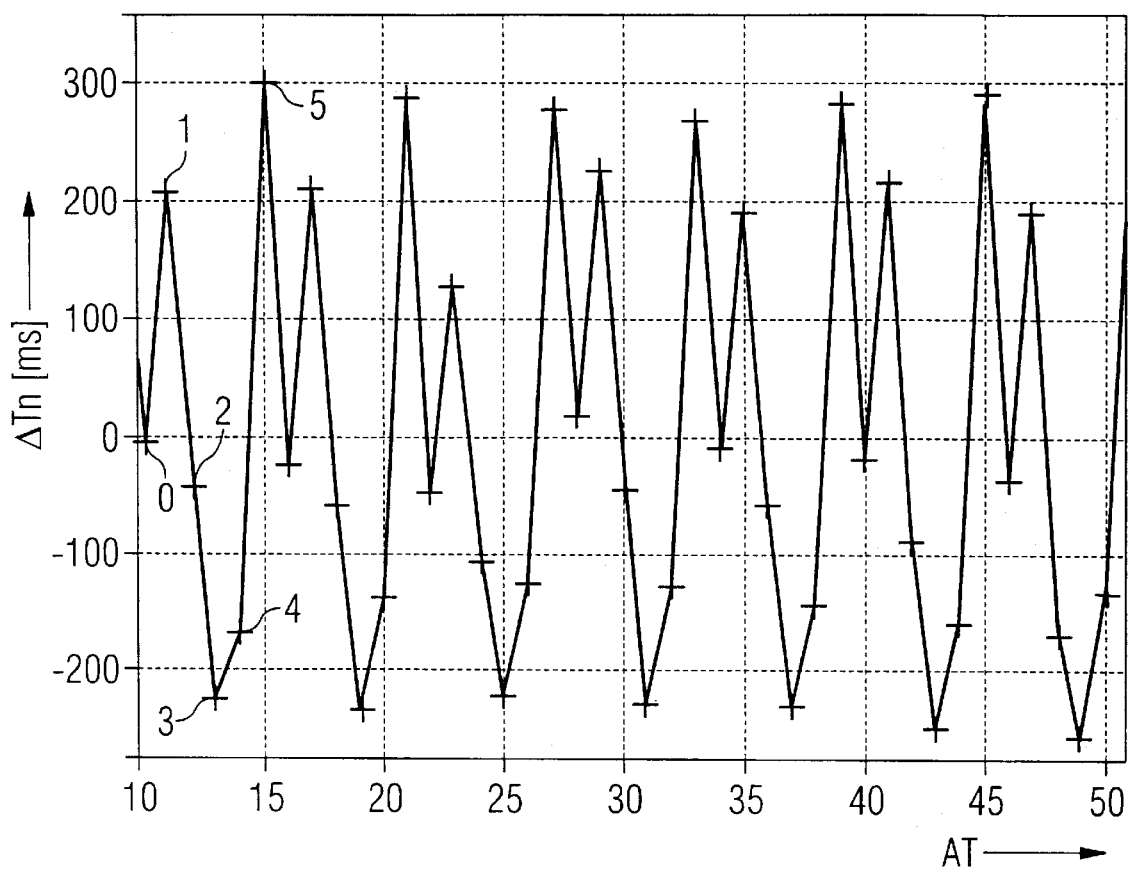

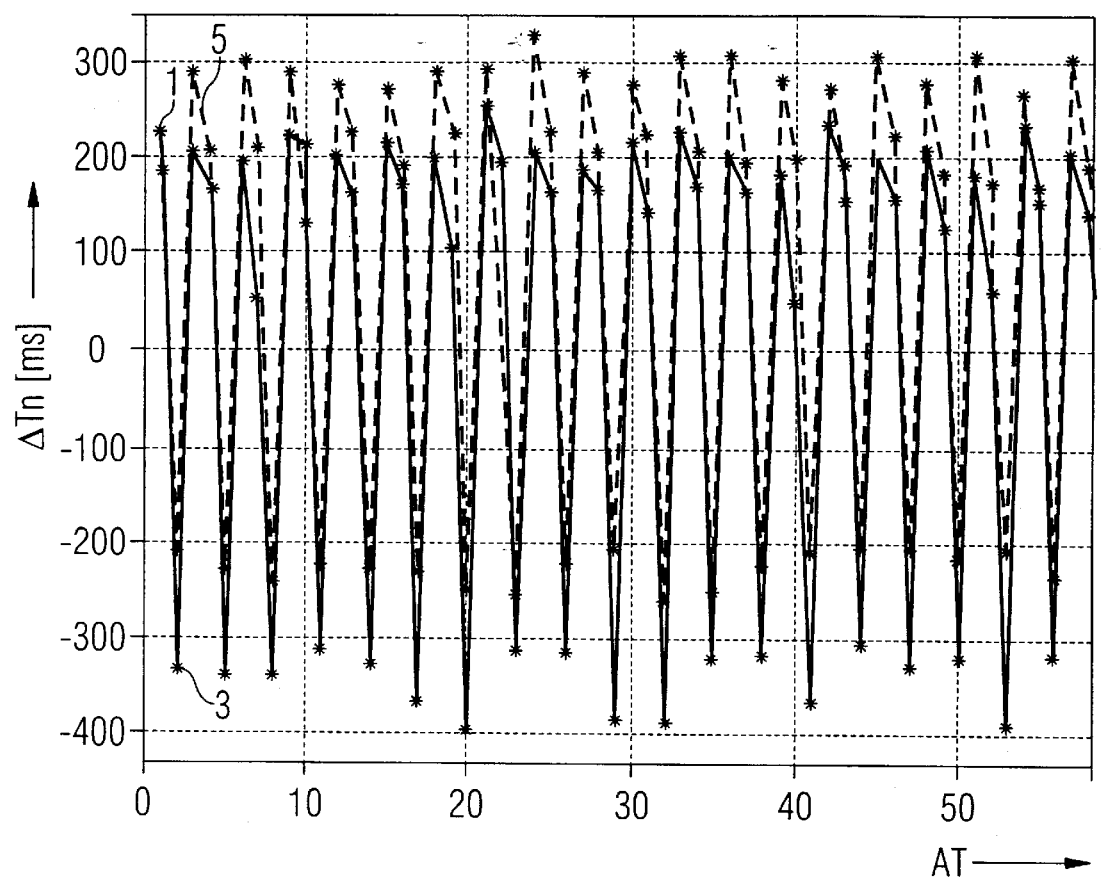

PROCESS FOR DETECTING CYCLICAL FLUCTUATIONS IN COMBUSTION IN AN INTERNAL COMBUSTION ENGINE

BACKGROUND OF THE INVENTION

The present invention relates to a method for detecting cyclical fluctuations in combustion, also known as combustion misfires, in a multi-cylinder internal combustion engine having at least two groups of functionally connected cylinders, in the case of which the time intervals that the crankshaft requires during the working cycles of the individual cylinders in order to traverse prescribed angular ranges are measured, and differences between respectively consecutive time intervals are analyzed by means of a prescribed algorithm, in order to detect combustion misfires.

Numerous methods are already known for detecting combustion misfires in an internal combustion engine, see EP 0 576 705 B1, EP 0 583 496 B1, EP 0 632 260 B1, WO 97/22786 and WO 97/20195, for example. These methods are based in principle on an evaluation of speed fluctuations caused by the misfires. More precisely, the time intervals (the so-called segment times) that the crankshaft requires during the working cycles of the individual cylinders in order to traverse prescribed angular ranges are measured, and differences between respectively consecutive time intervals are analyzed by means of a prescribed algorithm. Numerous algorithms have been developed in the prior art in order to take account of disturbing influences in the misfire detection such as a nonstationary operation of the internal combustion engine, manufacturing tolerances of the measuring device, vibrations of the crankshaft etc. As a result of increasing refinement of such algorithms, success has been achieved in detecting combustion misfires with adequate reliability in relatively wide operating ranges of the internal combustion engine.

However, it has emerged that errors occur nevertheless when detecting misfires in the case of specific internal combustion engines and specific operating states. This holds, in particular, for internal combustion engines having a relatively large number of cylinders. For example, in the case of an internal combustion engine having more than eight cylinders, the angular range of the crankshaft, or the associated segment time becomes very short (angular range= 720°/number of cylinders). A combustion misfire has a relatively slight effect on a segment time, that is to say the missing acceleration of the crankshaft is active during a shorter time because of the combustion misfire. The shorter the segment time, the more difficult it is to detect an increased segment time owing to a combustion misfire. This disadvantage is correspondingly more serious, of course, with a growing number of cylinders.

It is known, furthermore, that the algorithms used in misfire detection have the least accuracy for high speeds and low loading of the internal combustion engine, since in these operating states the disturbances to the crankshaft rotation caused by the internal combustion engine are particularly prominent and the combustion stability is relatively low.

SUMMARY OF THE INVENTION

It is the object of the present invention to develop a method for detecting combustion misfires in the case of a multi-cylinder internal combustion engine of the type specified at the beginning such that a reliable misfire detection is possible even with internal combustion engines having a high number of cylinders and a high speed and/or low load in operating states, and yet it is possible to use a conventional algorithm for the analysis of the time intervals (segment times). This object is achieved in accordance with the invention as claimed.

It is known to subdivide the cylinders of multicylinder internal combustion engines conventionally into a plurality of cylinder groups (cylinder banks). The present invention exploits this by switching off one cylinder group for the purpose of misfire detection (the fuel supply being interrupted), and carrying out the analysis by means of the prescribed algorithm only for the other cylinder group.

This measure has two advantageous effects:

Firstly, the load of the internal combustion engine is increased in order to maintain the required torque or the required power of the internal combustion engine with a smaller number of cylinders. The internal combustion engine therefore runs in an operating range in which the algorithm serving to detect misfires operates with relatively high accuracy.

Secondly, the switched off cylinders need not be taken into account when detecting misfires. This simplifies the detection of combustion misfires.

In the simplest case, the method according to the invention is carried out in such a way that the measured time intervals (segment times), which are assigned to the individual cylinders, are used in the analysis by means of the prescribed algorithm in a conventional way. The two effects mentioned above (lower load and smaller number of cylinders to be analyzed) result in a substantially higher accuracy in the analysis without the need to change anything in the conventional algorithm. The method according to the invention can therefore be implemented without a higher outlay by means of previously known methods for detecting misfires.

In a further refinement of the invention, use is preferably made of enlarged time intervals for carrying out the analysis which are composed in each case of the sum of the time intervals of two consecutive cylinders from the two cylinder groups. Since, after all, the switched-off cylinders need not be taken into account in the detection of misfires, the segment time of the switched-off cylinders can be added to the segment time of the cylinders continuing to be operated. The duration of the segment time of the combustion misfire is artificially lengthened in this way. This results in the advantage that the invention simulates a method for detecting misfires, for example in the case of an eight-cylinder internal combustion engine, as if it were in the case of a four-cylinder internal combustion engine. As has been said, all that is required for this purpose is to add the segment time for a switched-off cylinder to the segment time for the immediately preceding operated cylinder, while otherwise the algorithm which is present in any case for detecting misfires can continue to be used.

The strategy applied in this case may be explained somewhat more precisely below with the aid of an eight-cylinder internal combustion engine. Reference may be made for this purpose to the following table, in which the number of cylinders is given with their firing order together with the definition of the cylinder groups (cylinder banks):

| Number of cylinders in sequence | 1 | 2 | 3 | 4 | 5 | 6 | 7 | 8 |
|---|---|---|---|---|---|---|---|---|
| Cylinder bank definition | 1 | 2 | 1 | 2 | 1 | 2 | 1 | 2 |

The cylinders 1, 3, 5, 7 therefore belong to the first cylinder bank, and the cylinders 2, 4, 6 belong to the second cylinder bank.

It may now be assumed that a combustion misfire occurs in a cylinder of the first cylinder bank. It is then generally possible to use conventional methods of analysis such as are disclosed in the publications mentioned at the beginning to determine that a combustion misfire is occurring in the first cylinder bank, but not always to determine which cylinder is involved. In order to determine this, the following procedure is adopted in accordance with a preferred embodiment of the invention:

1. The cylinders of the second cylinder bank are all switched off, that is to say the fuel injection is interrupted.

2. In order to maintain the torque of the internal combustion engine, the cylinders of the first cylinder bank must be operated under increased loading. This alone already improves the accuracy of the method of detecting misfires operated with the aid of a conventional algorithm.

3. The segment time of each of the switched-off cylinders 2, 4, 6, 8 is now added to the segment time of the respectively following cylinder 1, 3, 5 and 7, respectively. If $T_n$ is the segment time of an arbitrary cylinder, and $T_n^*$ is the enlarged segment time of this cylinder, it holds that:

$$T_n^* = T_n + T_{n-1}$$

4. The analysis by means of the conventional algorithm is now carried out with the aid of this lengthened segment time $T_n^*$.

The result is that in the case of the eight-cylinder internal combustion engine the same algorithm and the same segment times of a four-cylinder internal combustion engine are used at a higher loading, and this leads to a substantially higher accuracy in the detection of misfires.

It may be pointed out that the method according to the invention can also be used for internal combustion engines in the case of which, for example at low loading, only a reduced number of cylinders are operated in any event. All that is required in this case is to modify one of the previously known methods of detecting misfires to the effect that the analysis by means of the prescribed algorithm is carried out not for the switched-off cylinder group, but only for the cylinder group continuing to be operated.

If it has been determined by an analysis with the aid of the prescribed algorithm that a combustion misfire has occurred, it is not always possible to determine correctly in which of the cylinder groups the combustion misfire has occurred. In this case, one of the cylinder groups is arbitrarily switched off. If, then, the analysis shows that no combustion misfire is occurring in the cylinder group continuing to be operated, the switched-off cylinder group is taken into operation again and the other cylinder group is switched off.

BRIEF DESCRIPTION OF THE DRAWINGS

A few test results will now be explained for the purpose of further illustrating the invention with the aid of the attached drawings, in which:

FIG. 1 shows a diagram in which segment time differences of a six-cylinder internal combustion engine are plotted against working cycles, and FIG. 2 shows a diagram corresponding to FIG. 1 that was obtained by using two different embodiments of the method according to the invention.

DETAILED DESCRIPTION OF THE PREFERRED EMBODIMENT

As already mentioned at the beginning, in the case of previously known methods for detecting combustion misfires the segment times $T_n$ that are required by the crankshaft during the working cycles of the individual cylinders in order to traverse prescribed angular ranges are measured, and differences between respectively consecutive segment times are analyzed by means of a more or less complicated algorithm. In this case, the measured segment times or the differences formed therefrom are corrected with the aid of the algorithm in order to exclude disturbing influences. Such an analysis method with the aid of an appropriate algorithm is disclosed, for example, in the above-mentioned WO 97/20195. However, it would also be possible to use a method in accordance with one of the other documents named at the beginning. Since the type of the algorithm used in the analysis is of no importance to the principle of the present invention, reference may be made to said documents for further details.

One embodiment of the method for detecting misfires according to the invention was tested with the aid of a six-cylinder internal combustion engine having the cylinder groups 1, 3, 5 and 0, 2, 4. The first step here was to switch off the second cylinder bank with the cylinders 0, 2, 4 by interrupting the fuel injection. Moreover, a combustion misfire was brought about permanently in the cylinder 3 of the first cylinder bank.

A previously known method for detecting misfires (see the publications mentioned at the beginning) was now used to measure the segment times $T_n$ for the individual cylinders and to form therefrom the differences between two respectively consecutive segment times, doing so as follows:

$$\Delta T_n = T_n - T_{n-1}.$$

It may be assumed in this case that the segment times $T_n$ and the differences $\Delta T_n$ are already values corrected by the algorithm used. Since, however, this plays no role in understanding the present invention, no further detail will be given on this correction.

The differences $\Delta T_n$ for the individual cylinders 0–5 (in ms) are plotted in FIG. 1 against the working cycles AT. As may be seen, the values for the individual cylinders 1 and 5 continuing to be operated are relatively high, while the values for the switched-off cylinders 0, 2 and 4 as well as for the cylinder 3 in which the combustion misfire occurs are relatively low. Since the method of analysis used analyzes not only the values for the cylinders continuing to be operated, but also for the switched-off cylinders, it is difficult using the diagram shown in FIG. 1 to detect that the combustion misfire is occurring in the cylinder 3.

Consequently, in accordance with one embodiment of the invention it is only the values of the cylinders 1, 3, 5 continuing to be operated that are analyzed, but otherwise with the aid of the same algorithm as in the case of the method according to FIG. 1. The result is reproduced by the solid line in FIG. 2. As illustrated by the arrows 1, 3, 5, the value of $\Delta T_n$ for the cylinder 3, in which the combustion misfire occurs, is very low by comparison with the corresponding values of the cylinders 1 and 5 continuing to be operated. It is therefore possible to determine that cylinder (cylinder 3) in which the combustion misfire occurs by means of a simple threshold value comparison.

An improved embodiment of the method according to the invention provides that the segment times are enlarged by in each case adding the time intervals of two consecutive cylinders from the two cylinder groups, as has already been explained in detail further above. The enlarged time intervals are then analyzed with the aid of the same algorithm. The result is illustrated by the dashed line in FIG. 2. As may be seen, the spacing between the values for the cylinders 1, 5, on the one hand, and the cylinder 3 having the combustion misfire, on the other hand, is somewhat greater than in the case of the initially described embodiment of the method according to the invention, so that it is possible to detect misfires with even higher accuracy and reliability.

What is claimed is:

1. A method for detecting combustion misfires in a multicylinder internal combustion engine having at least two groups of functionally connected cylinders, in the case of which the time intervals that the crankshaft requires during the working cycles of the individual cylinders in order to traverse prescribed angular ranges are measured, and differences between respectively consecutive time intervals are analyzed by means of a prescribed algorithm, in order to detect combustion misfires, comprising the steps of switching off the cylinders of one cylinder group and performing the analysis by means of the prescribed algorithm only for the cylinders of the cylinder group continuing to be operated.

2. The method as claimed in claim 1, further comprising the step of using in the analysis enlarged time intervals that are composed in each case of the sum of the time intervals of two consecutive cylinders from two cylinder groups.

3. The method as claimed in claim 2, further comprising the steps of determining by analysis with the aid of the prescribed algorithm whether a combustion misfire has occurred, and then switching off the cylinders of one cylinder group to carry out the analysis for the cylinder group continuing to be operated.

4. The method as claimed in claim 3, further comprising the steps of returning the switched-off cylinder group to operation and switching off the other cylinder group when the result of analysis is that no combustion misfire occurs in the cylinder group that was continuing to be operated.

5. The method as claimed in claim 3, further comprising the steps of specifying with the aid of the prescribed algorithm in which cylinder group a combustion misfire has occurred, and then switching off the other cylinder group to carry out the analysis for the cylinder group that was continuing to be operated.

6. The method as claimed in claim 3, wherein the method is applied in the case of operating states with high speed and/or low load of the internal combustion engine.

7. The method as claimed in claim 2, wherein the method is applied in the case of operating states with high speed and/or low load of the internal combustion engine.

8. The method as claimed in claim 1, further comprising the steps of determining by analysis with the aid of the prescribed algorithm whether a combustion misfire has occurred, and then switching off the cylinders of one cylinder group to carry out the analysis for the cylinder group continuing to be operated.

9. The method as claimed in claim 8, further comprising the steps of returning the switched-off cylinder group to operation and switching off the other cylinder group when the result of analysis is that no combustion misfire occurs in the cylinder group that was continuing to be operated.

10. The method as claimed in claim 8, further comprising the steps of specifying with the aid of the prescribed algorithm in which cylinder group a combustion misfire has occurred, and then switching off the other cylinder group to carry out the analysis for the cylinder group that was continuing to be operated.

11. The method as claimed in claim 8, wherein the method is applied in the case of operating states with high speed and/or low load of the internal combustion engine.

12. The method as claimed in claim 1, wherein the method is applied in the case of operating states with high speed and/or low load of the internal combustion engine.

* * * * *